(12) United States Patent
Youn et al.

(10) Patent No.: US 7,933,520 B2
(45) Date of Patent: Apr. 26, 2011

(54) HIGH-SPEED WAVELENGTH SELECTABLE OPTICAL SOURCE AND METHOD THEREOF

(75) Inventors: Chun-ju Youn, Yongin-si (KR);
Hyun-chin Kim, Seoul (KR);
Yeong-bae Yeo, Daegu (KR);
Young-kwang Seo, Seoul (KR);
Keun-joo Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 11/293,296

(22) Filed: Dec. 5, 2005

(65) Prior Publication Data
US 2006/0140628 A1    Jun. 29, 2006

(30) Foreign Application Priority Data
Dec. 29, 2004 (KR) .................. 10-2004-0115268

(51) Int. Cl.
*H04B 10/04* (2006.01)
*H04J 14/02* (2006.01)

(52) U.S. Cl. .............. 398/95; 398/45; 398/93; 398/195; 398/196

(58) Field of Classification Search .................. 398/45, 398/196, 95, 93, 79, 81, 195, 182, 197, 43
See application file for complete search history.

(56) References Cited

U.S. PATENT DOCUMENTS
6,331,907 B1 * 12/2001 Miyazaki et al. ............ 398/9
2001/0004290 A1 * 6/2001 Lee et al. .................. 359/124

FOREIGN PATENT DOCUMENTS
KR     10-0399049 B1     9/2003
KR     10-0532309 B1     11/2005
KR     10-0548926 B1     2/2006

OTHER PUBLICATIONS

Notice of Preliminary Rejection dated Jun. 21, 2010, issued by Korean Patent Office in a counterpart Korean Application No. 10-2004-0115268.

* cited by examiner

*Primary Examiner* — M. R. Sedighian
(74) *Attorney, Agent, or Firm* — Sughrue Mion, PLLC

(57) ABSTRACT

A high-speed wavelength selectable optical source and a method thereof are disclosed. The wavelength selectable optical source includes at least one optical source having a multimode oscillation spectrum, a demultiplexer and an optical switch for extracting light having a certain selected wavelength. A certain wavelength can be selected among the multimode wavelengths using the demultiplexer and the optical switch, and thus the wavelength can discontinuously be tuned at high speed. Also, by making the light having the selected wavelength incident to the multimode optical source, the power of the output light can uniformly be maintained and maximized through injection locking.

12 Claims, 3 Drawing Sheets

HIGH-SPEED WAVELENGTH SELECTABLE OPTICAL SOURCE AND METHOD THEREOF

This application claims benefit under 35 U.S.C. §119 from Korean Patent Application No. 2004-115268 filed on Dec. 29, 2004, the entire content of which is incorporated herein by reference.

BACKGROUND OF THE INVENTION

1. Field of the Invention

Apparatuses and methods consistent with the present invention relate to a high-speed wavelength selectable optical source and a method thereof, and more particularly to a high-speed wavelength selectable optical source and a method thereof which can selectively output a light having one wavelength among several wavelengths generated from a multimode optical source as an optical source for wavelength selectable optical communications.

2. Description of the Related Art

In constructing a communication network using light, one technology generally used to heighten the throughput and to achieve an effective network application is a WDM (Wavelength Division Multiplexing) transmission technology. This WDM transmission technology has already been researched by many research institutes and has already been introduced in networks provided by some long-distance communication service providers.

The WDM is a technology for carrying several kinds of data on one optical fiber using light having different wavelengths, and refers to an optical transmission method that improves communication capacity and speed.

The optical communication is superior to other communication methods in performing communications in a very wide frequency range. The WDM transmission method starts with the intention of utilizing such a wide frequency band to the maximum, and uses wavelength ranges of 1310 nm and 1550 nm. A recent WDM transmission method provides that several channels for carrying signals thereon are arranged at predetermined intervals of wavelength in the vicinity of the wavelength range of 1550 nm, and then optically multiplexed so that they are transmitted through one optical fiber. On the receiving side, the respective channels are demultiplexed by wavelength and then separately used.

Such optical sources for optical communications generally used may be a Light Emitting Diode (LED) and a laser diode, and for the WDM transmission, a plurality of single-wavelength optical sources that oscillates in different wavelengths is necessarily required.

The laser diode is composed of a semiconductor chip having one PN junction, one side surface of which constitutes a reflecting mirror. If current is applied to the PN junction, holes having a positive charge and electrons having a negative charge are coupled together to cause stimulated emission of light having a plurality of wavelengths to occur.

As described above, the optical source that emits light having a plurality of wavelengths is called a multimode optical source, and the optical source that outputs only the light having a wavelength selected among the plurality of wavelengths and attenuates the light having the remaining wavelengths is called a single-mode optical source. Further, a tunable optical source can output the light having a wavelength optionally selected among the plurality of wavelengths and change the selected wavelength as well.

As conventional tunable optical sources, there are an external cavity laser, a tunable Distributed FeedBack (DFB) laser disclosed in U.S. Pat. No. 6,754,243, etc.

The external cavity laser requires a stabilizing circuit for stabilizing the wavelength after the wavelength is tuned, and this causes the wavelength tunable speed to be lowered. Also, an unwanted transient effect may occur while the wavelength is tuned to a specified wavelength. Additionally, the tunable speed is lowered by the mechanical movement of an external mirror.

In the same manner, the tunable DFB laser requires several optical sources called a DFB laser array, and has a low tunable speed since it uses a Micro Electro-Mechanical System (MEMS) switch. Further, it requires an accurate control for connecting the MEMS switch and the laser diode.

Accordingly, an optical source which does not require plural optical sources, which has an improved wavelength tunable speed and which is easy to control is needed.

SUMMARY OF THE INVENTION

Illustrative, non-limiting embodiments of the present invention are provided in order to overcome the above disadvantages and other problems not described above. Also the present invention is not required to overcome the disadvantages described above, and an illustrative, non-limiting embodiment of the present invention may not overcome any of the problems described above.

An aspect of the present invention is to provide a high-speed wavelength selectable optical source and a method thereof which can separate a light having a certain wavelength from a multimode optical source, maximize and stably maintain the output of the separated light.

The foregoing and other aspects and advantages are substantially realized by providing a method of generating a high-speed wavelength selectable optical source, according to an aspect of the present invention, comprising: generating a light having at least two or more wavelengths; separating the light by wavelength; selecting a light having a wavelength selected among the separated wavelengths; transmitting the selected light to an optical source causing injection locking; and outputting the selected light whose power is uniformly maintained through the injection locking. The injection locking may be performed by changing a refractive index of the optical source by making the selected light incident to the optical source having the at least one multimode wavelength spectrum.

The injection locking may be caused by feedbacking the selected light to the optical source, i.e., making the selected light incident to the optical source, which has generated the light having at least one multimode wavelength spectrum. The feedbacking may be implemented by reflecting the selected light to the optical source.

The method may further comprise changing the selected wavelength to another wavelength selected among the two or more wavelengths.

In another aspect of the present invention, there is provided a high-speed wavelength selectable optical source comprising an optical source that: generates a light having at least two or more wavelengths; a demultiplexer that separates the light by wavelength and outputs lights having separated wavelengths; and an optical switch that selects a light having a wavelength selected among the separated wavelengths from the demultiplexer and outputs the selected light having the selected wavelength to the optical source to cause injection locking.

It is preferable, but not necessary, that the optical source is a multimode optical source that generates the light having discontinuous wavelengths arranged at specified wavelength intervals, and at least one discontinuous wavelength of the multimode optical source is the wavelength at a specified interval for a WDM or a Dense WDM (DWDM) according to recommendations of the telecommunication standardization part of International Telecommunication Union (ITU-T).

Further, the multimode optical source may be a Fabry-Perot Laser Diode (FP-LD).

The high-speed wavelength selectable optical source may further comprise an optical device that makes the injection locking of the optical source occur by making the selected light incident to the multimode optical source again.

The optical device may be a circulator that makes the selected light incident to the multimode optical source and provides the output of the multimode optical source to the demultiplexer, or may be an optical mirror that reflects a predetermined amount of the selected light so that the predetermined amount of the selected light is incident to the multimode optical source again and the injection locking of the optical source occurs.

In still another aspect of the present invention, there is provided a high-speed wavelength selectable optical source comprising: a first optical source that generates a light having a predetermined wavelength; a second optical source that generates a light having at least two or more wavelengths comprising the predetermined wavelength; a demultiplexer that separates the light from the first optical source by wavelength and outputs lights having separated wavelengths; and an optical switch that selects the predetermined wavelength selected among the separated wavelengths from the demultiplexer and outputs a light having the predetermined wavelength to the second optical source to cause injection locking.

The selected wavelength of the selected light may be tuned according to the switching operation of the optical switch.

In still another aspect of the present invention, there is provided a high-speed wavelength selectable optical source comprising: an optical amplifier that outputs a light having at least one wavelength and simultaneously amplifies an incident light with a predetermined gain: a reflective filter unit comprising at least one reflective filter that reflects a light having a predetermined wavelength, and an optical switch that outputs the light from the optical amplifier to a selected reflective filter and inputs the reflected light from the selected reflective filter to the optical amplifier. The high-speed wavelength selectable optical source may further comprise a high reflective filter that receives the selected light amplified by the optical amplifier, reflects a predetermined amount of the received light and outputs the remainder of the received light.

The above high-speed wavelength selectable optical source may further comprise an AWG that multiplexes the light from the optical amplifier into different wavelengths to transmit the multiplexed light to the optical switch.

BRIEF DESCRIPTION OF THE DRAWINGS

The above aspects and features of the present invention will be more apparent by describing exemplary embodiments of the present invention with reference to the accompanying drawings, in which.

DETAILED DESCRIPTION OF THE EXEMPLARY EMBODIMENTS

Figure 1:
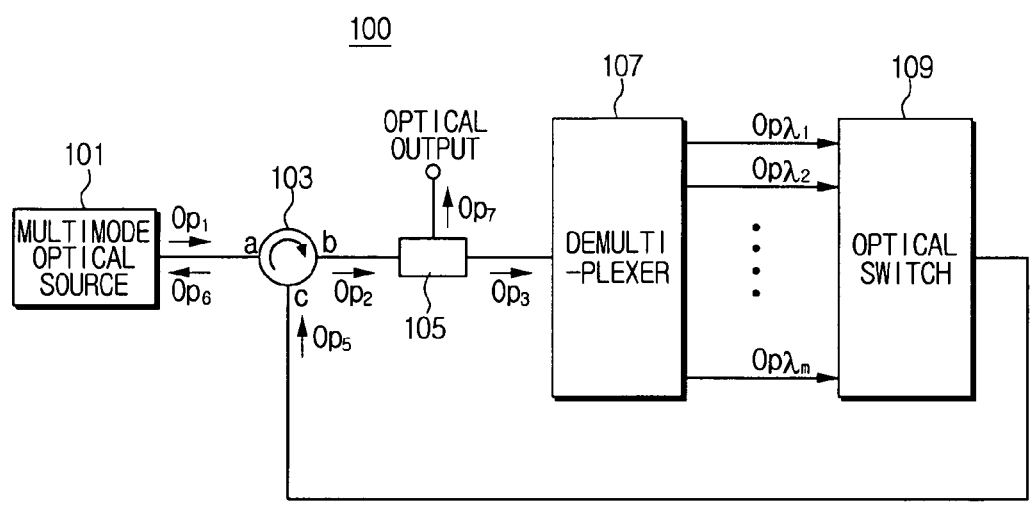
FIG. 1 is a block diagram illustrating a high-speed wavelength selectable optical source according to an exemplary embodiment of the present invention.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram illustrating a high-speed wavelength selectable optical source according to an exemplary embodiment of the present invention.

Referring to FIG. 1, a wavelength selectable optical source 100 includes a multimode optical source 101, a circulator 103, a coupler 105, a demultiplexer 107 and an optical switch 109.

The wavelength selectable optical source 100 can output a selected light that is a light having a wavelength $\lambda s$ (hereinafter referred to as a 'selected wavelength') selected among a plurality of wavelengths $\lambda 1$ to $\lambda m$. Also, the wavelengths of the light outputted from the wavelength selectable optical source 100 may discontinuously be tuned. This can remove the transient effect according to the tuning of the selected wavelength $\lambda s$.

Additionally, the wavelength selectable optical source 100 can uniformly maintain and stabilize the power of an output light and obtain a high optical power by using an injection locking method.

The multimode optical source 101 outputs a light $Op_1$ having a plurality of wavelengths $\lambda 1$ to $\lambda m$. The output of the multimode optical source 101 may be varied by wavelength, but the whole output is uniformly maintained. The wavelengths of the light $Op_1$ outputted from the multimode optical source 101 may be included in a predetermined wavelength range of a wavelength spectrum, and have predetermined intervals. It is recommended that the multimode optical source outputs light having wavelengths at intervals of 100 GHz (0.8 nm) or 50 GHz (0.4 nm) in a wavelength range of 1.53 μm to 1.56 μm for the WDM or DWDM according to recommendations of ITU-T. An FP-LD is an example of the multimode optical source 101.

Additionally, the multimode optical source 101 can receive a light $Op_6$ having a selected wavelength $\lambda s$ from the circulator 103 and stably oscillate only the selected wavelength $\lambda s$ by changing a refractive index through injection locking. Accordingly, the power of the light $Op_1$ outputted from the multimode optical source 101 is uniformly maintained. Also, since the whole output of the multimode optical source is uniformly maintained, the output of the light having the selected wavelength $\lambda s$ is relatively strengthened as the multimode optical source 101 oscillates the selective wavelength $\lambda s$ only, and it approximates the whole output of the multimode optical source 101.

Specifically, the multimode optical source 101 outputs the light $Op_1$ having a plurality of wavelengths until it receives the light $Op_6$ for the injection locking, and it outputs the light represented as the selected wavelength $\lambda s$ after it receives the light $Op_6$ having the selected wavelength $\lambda s$. That is, the optical power of the remaining wavelengths becomes greatly weak.

The circulator 103 has three terminals a, b and c, and outputs the light inputted to the terminal a through the terminal b while it outputs the light inputted to the terminal c through the terminal a. Accordingly, the circulator 103 receives the light $Op_1$ through the terminal a and outputs a light $Op_2$ through the terminal b, while it receives a light $Op_5$ having the selected wavelength $\lambda s$ through the terminal c and outputs the light $Op_6$ through the terminal a. The circulator 103 outputs again the light $Op_5$ inputted from the optical switch 109 to the terminal c to the multimode optical source 101 to cause the injection locking to occur.

In another exemplary embodiment of the present invention, another optical device (not illustrated) such as an optical mirror or an optical coupler may be used corresponding to the circulator 103.

The coupler 105 branches the light outputted from the circulator 103 to a light $Op_3$ to be inputted to the demultiplexer 107 and an output light $Op_7$. Generally, the coupler 105 divides the power of the input light or sums the two input lights.

The light $Op_7$ outputted from the coupler 105 is the final output light having the selected wavelength $\lambda s$. In other exemplary embodiments of the present invention, it is not necessarily required that the coupler 105 is provided between the circulator 103 and the demultiplexer 107, but may be provided to follow the optical switch 109.

The demultiplexer 107 receives the light $Op_3$ through the coupler 105 and outputs lights $Op\lambda1$ to $Op\lambda m$ corresponding to wavelengths $\lambda 1$ to $\lambda m$, respectively. Accordingly, the demultiplexer 107 has one input terminal for receiving one light and m output terminals. The m output terminals correspond to the wavelengths $\lambda 1$ to $\lambda m$ that include the selected wavelength $\lambda s$ of the light $Op\lambda s$. The light $Op_3$ is outputted from the multimode optical source 101, and may have all the wavelengths $\lambda 1$ to $\lambda m$ or the selected wavelength $\lambda s$ selected among the wavelengths $\lambda 1$ to $\lambda m$.

The optical switch 109 receives the lights $Op\lambda1$ to $Op\lambda m$ from the demultiplexer 107, and outputs the light $Op\lambda s$ having the wavelength $\lambda s$ selected through the switching operation as its output light $Op_5$. The output of the optical switch 109 may be fed back to the circulator 103.

The output of the optical switch 109 is inputted to the multimode optical source 101 through the circulator 103 to cause the injection locking occurs in the multimode optical source 101. However, since the injection locking is for uniformly maintaining and heightening the power of the light having the selected wavelength $\lambda s$, it is not necessarily required.

The optical switch 109 can tune the selected wavelength $\lambda s$ to another wavelength selected among the wavelengths $\lambda 1$ to $\lambda m$ through its switching operation. The tuning of the selected wavelength through the switching operation is performed discontinuously and can be performed at high speed using a high-speed optical switch.

Hereinafter, the whole operation of the wavelength selectable optical source 100 will be explained with reference to FIG. 2.

Figure 2:
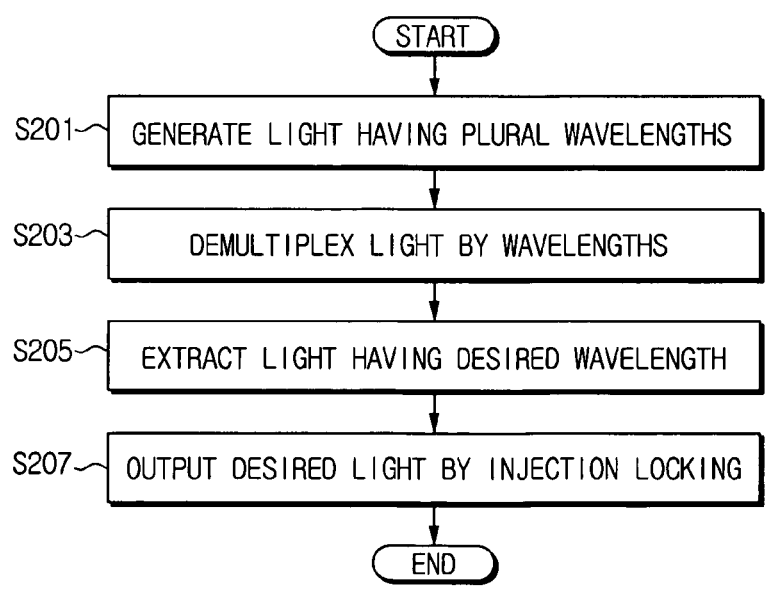
FIG. 2 is a flowchart illustrating a method of generating a high-speed wavelength selectable optical source according to an exemplary embodiment of the present invention.

FIG. 2, in reference to FIG. 1, illustrates a method of generating a high-speed wavelength selectable optical source according to an exemplary embodiment of the present invention.

First, the multimode optical source 101 generates and outputs the light $Op_1$ having a plurality of wavelengths $\lambda 1$ to $\lambda m$ (step S201).

The circulator 103 receives the light $Op_1$ from the terminal a and outputs the light $Op_2$ to the coupler 105 through the terminal b, and the coupler 105 receives the light $Op_2$ and outputs the light $Op_3$ to the demultiplexer 107. In this case, the lights $Op_2$ and $Op_3$ are the lights having the output powers differing by wavelength $\lambda 1$ to $\lambda m$ which are more than a predetermined value, and the optical power corresponding to the respective wavelength can be varied.

The demultiplexer 107 receives and demultiplexes the input light $Op_3$ into the lights $Op\lambda 1$ to $Op\lambda m$ having the wavelengths $\lambda 1$ to $\lambda m$ to output the demultiplexed lights to the optical switch 109 (step S203).

The optical switch 109 receives the lights $Op\lambda 1$ to $Op\lambda m$ from the demultiplexer 107, and outputs the light $Op\lambda s$ having a certain wavelength $\lambda s$ selected among the wavelengths $\lambda 1$ to $\lambda m$ as its output light $Op_5$. In this case, the light $Op_5$ has a power level obtained by dividing the whole output power of the multimode optical source 101 by m (step S205).

The light $Op_5$ outputted from the optical switch 109 is inputted to the multimode optical source 101 through the circulator 103 as its input light $Op_6$, and this light $Op_6$ causes the injection locking to occur in the multimode optical source 101.

The multimode optical source 101 receives the light $Op_6$ and outputs the light $Op_1$ in which the power of the selected wavelength $\lambda s$ is uniformly maintained and strengthened. At this time, since the output power of the multimode optical source 101 is uniformly maintained irrespective of the output wavelength, the power of the light $Op_1$ is concentrated upon the wavelength $\lambda s$ and approximates the whole output power of the multimode optical source 101.

The light $Op_1$ is inputted to the coupler 105 through the circulator 103 as its input light $Op_2$, and the light $Op_7$ is finally outputted from the coupler 105 (step S207).

If the injection locking occurs once, the lights $Op_1$, $Op_2$ and $Op_3$ become the lights in which the power is concentrated upon the selected wavelength $\lambda s$, and thus the outputs of the demultiplexer 107 and the optical switch 109 also become the lights in which the power is concentrated upon the selected wavelength $\lambda s$.

By the above-described method, the operation of the wavelength selectable optical source 100 according to an exemplary embodiment the present invention is performed.

The tuning of the selected wavelength $\lambda s$ is performed by switching the light, having a wavelength different from the existing selected wavelength $\lambda s$, among the lights $Op\lambda 1$ to $Op\lambda m$ through the optical switch 109 and outputting the light having the different wavelength as its output light $Op_5$. The power of the light $Op_5$ being switched and outputted is weak since it is not the existing selected wavelength $\lambda s$. However, if the light $Op_5$ having a new selected wavelength is inputted to the multimode optical source 101 to cause the injection locking to occur, the light $Op_1$ which has a uniform power and which is strengthened as high as the whole power of the multimode optical source 101 is outputted. Accordingly, the lights $Op_1$ and $Op_2$ and the output light $Op_7$ having the new selected wavelength $\lambda s'$ are outputted.

As described above, since the lights $Op_1$ to $Op_7$ after the injection locking occurs have the uniform output power and the power is concentrated upon the new selected wavelength λs' in the lights, it is not necessarily required that the coupler 105 which outputs the final output light $Op_7$ is positioned between the circulator 103 and the demultiplexer 107, but the coupler 105 may be positioned to follow the optical switch 109 according to another embodiment of the present invention.

Figure 3:
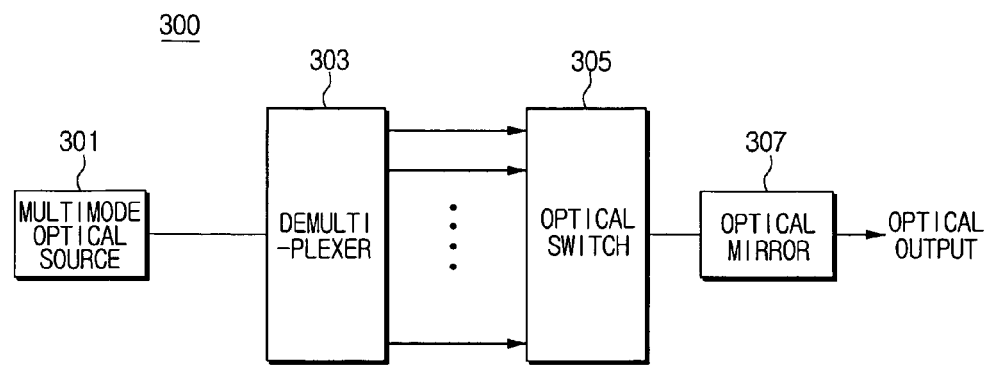
FIG. 3 is a block diagram illustrating a high-speed wavelength selectable optical source according to another exemplary embodiment of the present invention.

FIG. 3 is a block diagram illustrating a high-speed wavelength selectable optical source according to another exemplary embodiment of the present invention.

Referring to FIG. 3, the wavelength selectable optical source 300 includes a multimode optical source, a demultiplexer 303, an optical switch 305 and an optical mirror 307. The multimode optical source 301, the demultiplexer 303 and the optical switch 305 correspond to the multimode optical source 101, the demultiplexer 107 and the optical switch 109 as illustrated in FIG. 1 and operate in the same manner.

The optical mirror 307 reflects a predetermined amount of the input light and outputs the remainder of the input light. For example, it reflects 90% of the input light and outputs 10% of the input light.

The wavelength selectable optical source 300 selects the light having the selected wavelength λs through the optical switch 305 and outputs the selected light to the optical mirror 307. The optical mirror 307 reflects and inputs 90% of the light having the selected wavelength λs to the optical switch 305 to cause the injection locking to occur in the multimode optical source 301, and thus the output of the light outputted from the optical mirror 307 through the optical switch 305 is kept uniform.

The wavelength selectable optical source 300 of FIG. 3 can also tune the selected wavelength λs through the switching of the optical switch 305.

Figure 4:
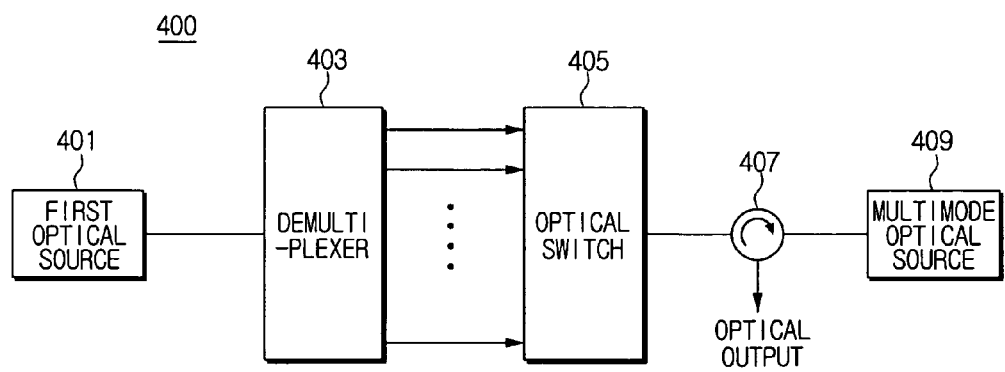
FIG. 4 is a block diagram illustrating a high-speed wavelength selectable optical source according to still another exemplary embodiment of the present invention.

FIG. 4 is a block diagram illustrating a high-speed wavelength selectable optical source according to still another exemplary embodiment of the present invention.

The wavelength selectable optical source 400 of FIG. 4 has the same concept as those illustrated in FIGS. 1 and 2. It selects the light having the selected wavelength λs from a certain optical source, uniformly maintains and strengthens the output power of the selected light by the injection locking.

The wavelength selectable optical source 400 of FIG. 4 includes a first optical source 401, a demultiplexer 403, an optical switch 405, a circulator 407 and a multimode optical source 409. The demultiplexer 403, the optical switch 405, the circulator 407 and the multimode optical source 409 correspond to the demultiplexer 107, the optical switch 109, the circulator 103 and the multimode optical source 101, respectively.

The first optical source 401 provides a seed of the light having the selected wavelength λs which will be incident to the multimode optical source 409 to cause the injection locking to occur. The first optical source 401 may be the same optical source as the multimode optical source 409. Also, the first optical source may not be an optical source that outputs the light having a plurality of discontinuous wavelengths such as the multimode optical source 409, but may be an optical source such as noise having a continuous wavelength spectrum in a specified wavelength range, which corresponds to Amplified Spontaneous Emission (ASE) and so on.

The output of the first optical source 401 is inputted by wavelength to the optical switch 405 through the demultiplexer 403, and a light having the selected wavelength λs is outputted from the optical switch. The light having the selected wavelength λs is inputted to the multimode optical source 409 to cause the injection locking to occur, and thus the light which has the uniform power of the selected wavelength λs and which approximates the whole output power of the multimode optical source 409 is outputted through the circulator 407.

Figure 5:
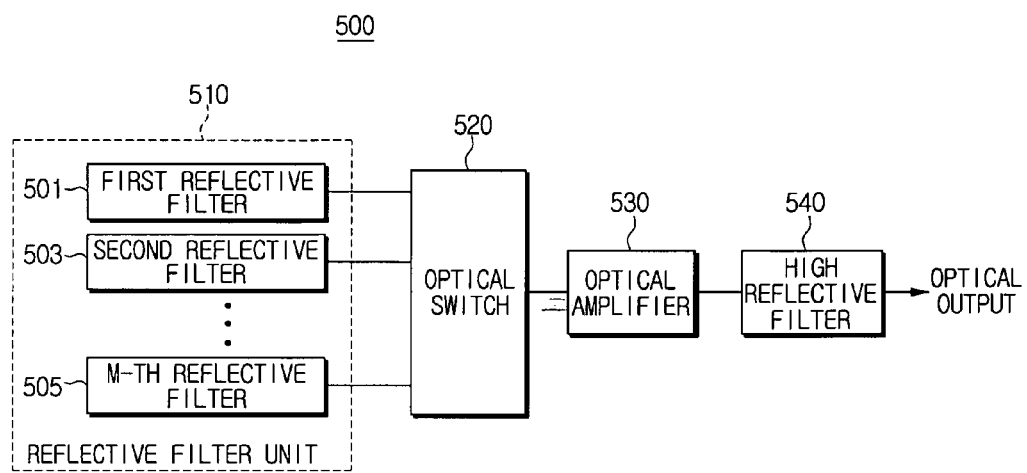
FIG. 5 is a block diagram of a high-speed wavelength selectable optical source according to still another exemplary embodiment of the present invention.

FIG. 5 is a block diagram of a high-speed wavelength selectable optical source according to still another exemplary embodiment of the present invention.

Referring to FIG. 5, the high-speed wavelength selectable optical source 500 includes a reflective filter unit 510, an optical switch 520, an optical amplifier 530 and a high reflective filter 540.

The reflective filter unit 510 includes first to m-th reflective filters 501, 503 and 505. The first to m-th reflective filters 501, 503 and 505 reflect only lights having predetermined wavelength ranges, respectively, among the incident lights. The wavelengths of the lights reflected by the first to m-th reflective filters 501, 503 and 505 may correspond to λ1 to λm, respectively, which are recommended by ITU-T.

The optical switch 520, which corresponds to the optical switch 109 of FIG. 1, outputs the light inputted from the optical amplifier 530 to the reflective filter that corresponds to the selected wavelength λs among the first to m-th reflective filters 501, 503 and 505, and forms an optical path between the selected reflective filter and the optical amplifier 530.

The optical amplifier 530 outputs the light having the wavelength characteristic in that its wavelengths continuously appear over a predetermined band on the wavelength spectrum, and amplifies the incident light with a specified gain to output the amplified light to the high reflective filter 540.

The high reflective filter 540 reflects a predetermined amount of the incident light and outputs the remainder of the light with respect to all the wavelengths of the incident light. The amount of light reflected by the high reflective filter 540 may be about 90% of the incident light.

According to the wavelength selectable optical source 500 of FIG. 5, the optical switch 520 switches the light having a wavelength within a predetermined range, which is outputted from the optical amplifier 530, to a reflective filter that corresponds to the selected wavelength λs among the first to m-th reflective filters 501, 503 and 505, so that the light is incident to the corresponding reflective filter. If it is assumed that the selected wavelength λs is λ1, the optical switch 520 switches the output of the optical amplifier to the first reflective filter 501.

The first reflective filter 501 reflects the light having the wavelength λ1, among the lights inputted from the optical switch.

The light reflected by the first reflective filter 501 is amplified by the optical amplifier 530 through the optical switch 520, and then outputted to the high reflective filter 540.

The high reflective filter 540 is not necessarily required in the present invention, but is provided in order to enhance the wavelength selectivity of the output light and to output the light having the wavelength selectivity better than the wavelength spectrums of the lights outputted from the first to m-th reflective filters 501, 503 and 505.

The wavelength selectivity of the output light is heightened by placing the optical amplifier 530 between the high reflective filter 540 and the first to m-th reflective filters 501, 503 and 505.

Figure 6:
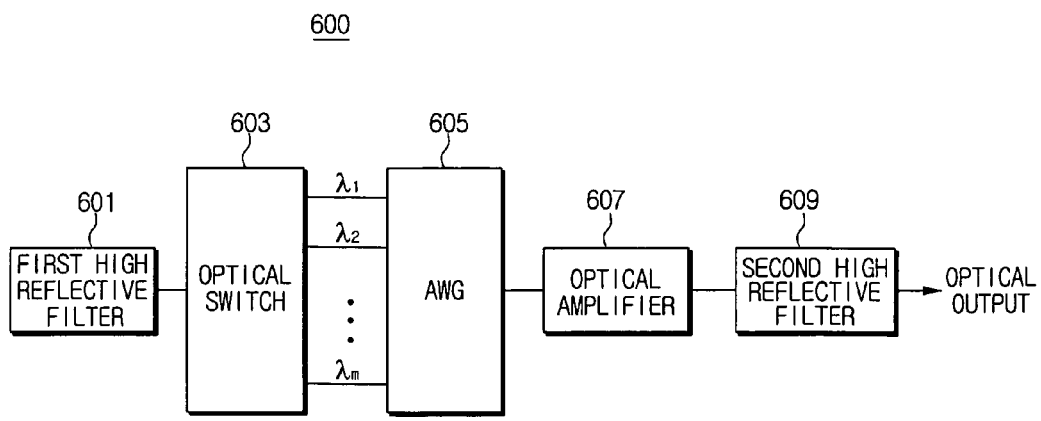
FIG. 6 is a block diagram of a high-speed wavelength selectable optical source according to still another exemplary embodiment of the present invention.

The wavelength selectable optical source 500 of FIG. 5 may be implemented as shown in FIG. 6.

FIG. 6 is a block diagram of a high-speed wavelength selectable optical source according to still another exemplary embodiment of the present invention.

Referring to FIG. 6, the wavelength selectable optical source 600 includes a first high reflective filter 601, an optical switch 603, an AWG 605, an optical amplifier 607 and a second high reflective filter 609.

The optical amplifier 607 and the optical switch 603 correspond to the optical amplifier 530 and the optical switch 520 of FIG. 5.

Since the AWG 605 performs both functions of a multiplexer for multiplexing input of at least one light having different wavelengths and a demultiplexer for demultiplexing one light by wavelength, it separates the output of the optical amplifier 607 by wavelengths λ1 to λm.

The first and second high reflective filters 601 and 609 reflect predetermined amounts of the incident lights, respectively. The first high reflective filter 601 may reflect the whole amount of the incident light, and the second high reflective filter 609 may reflect 90% or more of the incident light.

Basically, the wavelength selectable optical source 600 operates in the similar manner to the wavelength selectable optical source 500 of FIG. 5. The AWG 605 separates the light outputted from the optical amplifier 607 by wavelength, and the optical switch switches the light having the selected wavelength to the first high reflective filter 601.

The light reflected by the first high reflective filter 601 is amplified by the optical amplifier 607, and the wavelength selectivity of the amplified light is improved through the second high reflective filter 609.

As described above, according to the present invention, a wavelength tunable optical source can be implemented from an optical source that outputs one light having a plurality of wavelengths.

Also, the wavelength tuning is discontinuously performed at high speed by using a high-speed optical switch.

Additionally, the output power of the light having the wavelength selected through the tuning can uniformly be maintained by the injection locking. Accordingly, it is not required to employ a complicated wavelength stabilizing circuit for stabilizing the output power. Further, the power of the light simply outputted can be heightened.

Additionally, the high-speed wavelength selectable optical source can economically be constructed using a low-priced multimode optical source.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of generating a high-speed wavelength selectable optical source, the method comprising:
generating light having a plurality of wavelengths from an optical source;
separating the light according to wavelength;
selecting light having a wavelength from among the light separated according to wavelength; and
transmitting the selected light to the optical source, thereby causing injection locking of the optical source,
wherein the generating generates light having only the selected wavelength by injection locking of the optical source if the selected light having the selected wavelength is fed back to the optical source in the state where the optical source generates light having the plurality of wavelengths.

2. The method as claimed in claim 1, wherein the injection locking of the optical source causes a refractive index of the optical source to change.

3. The method as claimed in claim 1, further comprising changing the selected wavelength to another wavelength selected among the plurality of wavelengths.

4. The method as claimed in claim 3, wherein the changing of the selected wavelength to another wavelength is performed discontinuously using a high-speed optical switch.

5. A high-speed wavelength selectable optical source comprising:
an optical source that generates light having a plurality of wavelengths;
a demultiplexer that separates the light according to wavelength and outputs separated light having different wavelengths; and
an optical switch that selects light having a wavelength from among the separated light and outputs the selected light having the selected wavelength to the optical source to cause injection locking of the optical source,
wherein the optical source generates light having only the selected wavelength by injection locking of the optical source if the selected light having the selected wavelength is fed back to the optical source in the state where the optical source generates light having the plurality of wavelengths.

6. The high-speed wavelength selectable optical source as claimed in claim 5, wherein the optical source comprises a multimode optical source, and the light generated by the multimode optical source comprises light having discontinuous wavelengths arranged at specified wavelength intervals.

7. The high-speed wavelength selectable optical source as claimed in claim 6, wherein at least one discontinuous wavelength of the multimode optical source is a wavelength arranged at a specified interval for at least one of a Wavelength Division Multiplexing (WDM) and a Dense WDM according to recommendations of the telecommunication standardization part of the International Telecommunication Union.

8. The high-speed wavelength selectable optical source as claimed in claim 6, wherein the multimode optical source is a Fabry-Perot Laser Diode.

9. The high-speed wavelength selectable optical source as claimed in claim 5, wherein the injection locking of the optical source causes a refractive index of the optical source to change.

10. The high-speed wavelength selectable optical source as claimed in claim 5, further comprising an optical device that makes the selected light incident on the optical source to trigger the injection locking.

11. The high-speed wavelength selectable optical source as claimed in claim 10, wherein the optical device comprises a circulator.

12. The high-speed wavelength selectable optical source as claimed in claim 5, wherein the demultiplexer separates the light generated by the optical source according to the plurality of wavelengths output from the optical source.

* * * * *